(12) United States Patent
Zhang et al.

(10) Patent No.: US 10,512,059 B2
(45) Date of Patent: Dec. 17, 2019

(54) POSITIONING BASE STATION, POSITIONING SYSTEM AND POSITIONING METHOD

(71) Applicant: NOLO CO., LTD., Beijing (CN)

(72) Inventors: Jianing Zhang, Beijing (CN); Daoning Zhang, Beijing (CN)

(73) Assignee: NOLO CO., LTD., Beijing (CN)

(*) Notice: Subject to any disclaimer, the term of this patent is extended or adjusted under 35 U.S.C. 154(b) by 0 days.

(21) Appl. No.: 16/324,775

(22) PCT Filed: Aug. 8, 2017

(86) PCT No.: PCT/CN2017/096348
§ 371 (c)(1),
(2) Date: Feb. 11, 2019

(87) PCT Pub. No.: WO2018/095072
PCT Pub. Date: May 31, 2018

(65) Prior Publication Data
US 2019/0174455 A1 Jun. 6, 2019

(30) Foreign Application Priority Data
Nov. 25, 2016 (CN) .......................... 2016 1 1055779

(51) Int. Cl.
*H04W 24/00* (2009.01)
*H04W 64/00* (2009.01)
(Continued)

(52) U.S. Cl.
CPC ............. *H04W 64/003* (2013.01); *G01S 5/16* (2013.01); *G01S 5/26* (2013.01); *G01S 7/4814* (2013.01);
(Continued)

(58) Field of Classification Search
CPC ..... G01S 5/14; G01S 17/06; H04L 29/08657; H04W 4/02; H04W 4/029; H04W 64/00
See application file for complete search history.

(56) References Cited

U.S. PATENT DOCUMENTS 6,329,948 B1 * 12/2001 Ishikawa ............... G01S 5/0063
342/357.27
7,221,314 B2 * 5/2007 Brabec ................. G01C 15/002
342/357.27
(Continued)

FOREIGN PATENT DOCUMENTS

CN 1082741 2/1994
CN 103760517 4/2014
(Continued)

OTHER PUBLICATIONS

International Search Report and Written Opinion Form PCT/ISA/220 and PCT/ISA/237, International Application No. PCT/CN2017/096348, pp. 1-7, International Filing Date Aug. 8, 2017, dated Sep. 27, 2017.

*Primary Examiner* — Shantell L Heiber
(74) *Attorney, Agent, or Firm* — Bond Schoeneck & King, PLLC; George McGuire

(57) ABSTRACT

Provided is a positioning base station includes: a rotating laser plane emitting unit, a distance measuring device and a synchronization device. The rotating laser plane emitting unit is configured to rotate around a rotation axle, and emit two laser plane signals having a preset angle therebetween. The two laser plane signals are configured to scan a space. The distance measuring device is configured to emit a distance measuring signal configured to measure a distance between the positioning base station and a device to be positioned. The synchronization device is configured to
(Continued)

transmit a synchronization signal configured to synchronize time of the positioning base station and the device to be positioned.

19 Claims, 10 Drawing Sheets

(51) Int. Cl.
  *G01S 17/08* (2006.01)
  *G01S 11/12* (2006.01)
  *G01S 5/16* (2006.01)
  *G01S 5/26* (2006.01)
  *G01S 7/481* (2006.01)

(52) U.S. Cl.
  CPC ............. *G01S 7/4817* (2013.01); *G01S 11/12* (2013.01); *G01S 17/08* (2013.01)

(56) References Cited

U.S. PATENT DOCUMENTS

| | | |
|---|---|---|
| 2006/0044570 A1 | 3/2006 | Konetschny |
| 2010/0278060 A1* | 11/2010 | Lee ...................... H04W 64/00 370/252 |
| 2016/0131761 A1* | 5/2016 | Yates ...................... G01S 7/481 356/3.11 |

FOREIGN PATENT DOCUMENTS

| | | |
|---|---|---|
| CN | 106526538 | 3/2017 |
| CN | 106526539 | 3/2017 |
| CN | 106526540 | 3/2017 |
| CN | 106646365 | 5/2017 |
| CN | 206209094 | 5/2017 |
| CN | 206209095 | 5/2017 |
| CN | 206248821 | 6/2017 |
| CN | 206248822 | 6/2017 |

* cited by examiner

POSITIONING BASE STATION, POSITIONING SYSTEM AND POSITIONING METHOD

CROSS-REFERENCE TO RELATED APPLICATION

The present application is the U.S. National Stage Application, filed under 35 U.S.C. 371, of International Patent Application No. PCT/CN2017/096348, filed on Aug. 8, 2017, which claims priority to Chinese patent application No. 201611055779.2 filed on Nov. 25, 2016, contents of both of which are incorporated herein by reference in their entireties.

TECHNICAL FIELD

The present disclosure relates to the field of positioning technologies, for example, to a positioning base station, a positioning system and a positioning method.

BACKGROUND

With the development of positioning devices and network technologies, location-based services are becoming more and more important in people's lives. The current positioning can be divided into outdoor positioning and indoor positioning according to different positioning areas. The outdoor positioning is mainly implemented by a satellite positioning system. The current outdoor positioning technology can well meet the needs of the outdoor positioning. However, when positioning indoors, due to the limitations of positioning time, positioning accuracy, and complicate indoor environment, the outdoor positioning technology, when is applied to the indoor positioning, cannot meet the needs of users.

To implement the indoor positioning, in a related art, positioning awareness is performed by solutions, such as an indoor global positioning system, infrared, Bluetooth and the like. However, in the related art, the cost of the indoor positioning solutions is high, the device configuration is complex, and the positioning accuracy needs to be improved.

SUMMARY

In view of this, embodiments of the present disclosure provide a positioning base station, a positioning system and a positioning method, which simplifies structure of the positioning base station, facilitates miniaturization, reduces manufacturing cost, and has a high positioning accuracy.

A positioning base station includes:

a rotating laser plane emitting unit, a distance measuring device and a synchronization device.

The rotating laser plane emitting unit is configured to rotate around a rotation axle and emit two laser plane signals having a preset angle therebetween. The two laser plane signals are configured to scan a space.

The distance measuring device is configured to emit a distance measuring signal. The distance measuring signal is configured to measure a distance between the positioning base station and a device to be positioned.

The synchronization device is configured to transmit a synchronization signal. The synchronization signal is configured to synchronize time of the positioning base station and the device to be positioned.

Optionally, the positioning base station further includes a control device, which is configured to control a rotation speed of the rotating laser plane emitting unit, control the rotating laser plane emitting unit to emit the two laser plane signals and control the synchronization device to transmit the synchronization signal.

Optionally, the rotating laser plane emitting unit includes a laser source, an emission grating and a driving device.

The laser source is configured to emit a line laser signal.

The emission grating is configured to convert the line laser signal emitted from the laser source to the two laser plane signals having a preset angle therebetween.

The driving device is configured to drive the two laser plane signals emitted from the emission grating to rotate around the rotation axle so that the two laser plane signals scan the space separately.

Optionally, the rotating laser plane emitting unit further includes an emission mirror.

The emission mirror is configured to change an emission direction of the line laser signal emitted from the laser source, and lead the line laser signal obtained after the emission direction is changed to the emission grating.

Optionally, the emission grating is an optical structure including a first portion and a second portion.

The first portion is configured to convert the line laser signal emitted from the laser source to a first laser plane signal.

The second portion is configured to convert the line laser signal emitted from the laser source to a second laser plane signal.

The first laser plane signal and the second laser plane signal have the preset angle therebetween.

Optionally, the optical structure is a wave lens. The first portion includes multiple first wave lines, and the multiple first wave lines are arranged in parallel.

The second portion includes multiple second wave lines, and the multiple second wave lines are arranged in parallel.

The direction of the multiple first wave lines is different from that of the multiple second wave lines.

Optionally, the distance measuring device is an ultrasonic emission device, which is configured to emit an ultrasonic signal.

A positioning system includes an above-mentioned positioning base station, an above-mentioned device to be positioned and a calculation device.

The device to be positioned is configured to receive a synchronization signal transmitted from a synchronization device in the positioning base station, two laser plane signals having the preset angle therebetween emitted from the positioning base station and a distance measuring signal emitted from a distance measuring device, and record a first reference time at which the synchronization signal is received, a first time and a second time at which the two laser plane signals are respectively received and a third time at which the distance measuring signal is received, respectively.

The calculation device which is configured to determine, according to the first reference time, the first time, the second time and a rotation speed of a rotating laser plane emitting unit in the positioning base station, a first rotation angle of a target laser plane rotating based on the first reference time to the first time, and a second rotation angle of the target laser plane rotating based on the first reference time to the second time.

The target laser plane is a plane in which a laser plane signal that firstly scans the device to be positioned in the two laser plane signals is located.

The calculation device, which is further configured to determine, according to a second reference time at which the distance measuring signal is emitted, the third time at which the device to be positioned receives the distance measuring signal and a travel speed of the distance measuring signal in a space, a distance between the device to be positioned and the positioning base station; and determine, according to the first rotation angle, the second rotation angle and the distance between the device to be positioned and the positioning base station, a position of the device to be positioned.

Optionally, the calculation device and the device to be positioned are integrally configured; or the calculation device and the device to be positioned are separately configured, and communicate in a wired or wireless manner.

Optionally, the first reference time is the same as the second reference time; or the second reference time is time of transmitting the distance measuring signal obtained based on the transmission time of the synchronization signal and a set time difference.

A positioning method includes:

receiving, by a device to be positioned, a synchronization signal transmitted from a synchronization device in a positioning base station, two laser plane signals emitted at a set angle from the positioning base station and a distance measuring signal emitted from a distance measuring device, and recording a first reference time at which the synchronization signal is received, a first time and a second time at which the two laser plane signals are respectively received and a third time at which the distance measuring signal is received, respectively;

determining, by the calculation device, according to the first reference time, the first time, the second time and a rotation speed of a rotating laser plane emitting unit in the positioning base station, a first rotation angle of a target laser plane rotating based on the first reference time to the first time, and a second rotation angle of the target laser plane rotating based on the first reference time to the second time; and the target laser plane is a plane in which a laser plane signal that firstly scans the device to be positioned in the two laser plane signals is located;

determining, by the calculation device, according to a second reference time at which a distance measuring signal is emitted, the third time at which the device to be positioned receives the distance measuring signal, a distance between the device to be positioned and the positioning base station; and determining, by the calculation device, according to the first rotation angle, the second rotation angle and the distance between the device to be positioned and the positioning base station, a position of the device to be positioned.

Optionally, the two laser plane signals having a preset angle therebetween emitted from the positioning base station is emitted by the rotating laser plane emitting unit. The rotating laser plane emitting unit includes a laser source, an emission grating and a driving device.

The laser source is configured to emit a line laser signal.

The emission grating is configured to convert the line laser signal emitted from the laser source to the two laser plane signals which are emitted at the set angle.

The driving device is configured to drive the two laser plane signals emitted from the emission grating to rotate around the rotation axle so that the two laser plane signals scan the space separately.

Optionally, the emission grating is an optical structure including a first portion and a second portion.

The first portion is configured to convert the line laser signal emitted from the laser source to a first laser plane signal.

The second portion is configured to convert the line laser signal emitted from the laser source to a second laser plane signal.

The preset angle is formed between first laser plane signal and the second laser plane signal.

Optionally, the two laser plane signals include a first laser plane signal and a second laser plane signal. A plane formed by the first laser plane signal parallels the rotation axle and a plane formed by the second laser plane signal is disposed at 45° with respect to the rotation axle.

The step of determining, according to the first rotation angle, the second rotation angle and the distance between the device to be positioned in the space and the positioning base station, the position of the device to be positioned includes:

determining the position of the device to be positioned based on the following formula:

$$x = \frac{l\cos\theta_1}{\sqrt{1+\sin^2(\theta)}}$$

$$y = \frac{l\sin(\theta)}{\sqrt{1+\sin^2(\theta)}}$$

$$z = \frac{l\sin\theta_1}{\sqrt{1+\sin^2(\theta)}};$$

Where x denotes a coordinate of the device to be positioned in a direction of X-axis, y denotes a coordinate of the device to be positioned in a direction of Y-axis, z denotes a coordinate of the device to be positioned in a direction of Z-axis; l denotes the distance between the device to be positioned and the positioning base station; $\theta=\theta_2-\theta_1$, $\theta_1$ denotes the first rotation angle, and $\theta_2$ denotes the second rotation angle.

Optionally, the two laser plane signals include a first laser plane signal and a second laser plane signal. A plane formed by the first laser plane signal is disposed at 90° with respect to a plane formed by the second laser plane signal. The plane formed by the first laser plane signal and the plane formed by the second laser plane signal are all disposed at 45° with respect to the rotation axle.

The step of determining, according to the first rotation angle, the second rotation angle and the distance between the device to be positioned and the positioning base station, the position of the device to be positioned includes:

determining the position of the device to be positioned based on the following formula:

$$x = \frac{l\cos\theta_1}{\sqrt{1+\sin^2\left(\frac{\theta}{2}\right)}}$$

$$y = \frac{l\sin\left(\frac{\theta}{2}\right)}{\sqrt{1+\sin^2\left(\frac{\theta}{2}\right)}}$$

$$z = \frac{l\sin\theta_1}{\sqrt{1+\sin^2\left(\frac{\theta}{2}\right)}};$$

Where x denotes a coordinate of the device to be positioned in a direction of X-axis, y denotes a coordinate of the device to be positioned in a direction of Y-axis, z denotes a coordinate of the device to be positioned in a direction of Z-axis; l denotes the distance between the device to be positioned and the positioning base station; $\theta=\theta_2-\theta_1$, $\theta_1$ denotes the first rotation angle, and $\theta_2$ denotes the second rotation angle.

Optionally, the two laser plane signals includes a first laser plane signal and a second laser plane signal, a plane formed by the first laser plane signal is disposed at a third preset angle with respect to the rotation axle, the plane formed by the second laser plane signal is disposed at a fourth preset angle with respect to the rotation axle.

The step of determining, according to the first rotation angle, the second rotation angle and the distance between the device to be positioned and the positioning base station, the position of the device to be positioned includes:

determining the position of the device to be positioned based on the following formula:

$$x = r \cos \theta_1$$

$$y = r \sin \beta_1 \cot \alpha_1$$

$$z = r \sin \theta_1;$$

Where x denotes a coordinate of the device to be positioned in a direction of X-axis, y denotes a coordinate of the device to be positioned in a direction of Y-axis, z denotes a coordinate of the device to be positioned in a direction of Z-axis; l denotes the distance between the device to be positioned and the positioning base station;

$$\beta_1 = \arctan\left(\frac{\sin\theta \cot\alpha_2}{\cot\alpha_1 + \cos\theta\cot\alpha_2}\right), \quad r = \frac{l}{\sqrt{1 + \sin^2\beta_1 \cot^2\alpha_1}},$$

$\alpha_1$ denotes an angle between the plane formed by the second laser plane signal and the rotation axle, and is the fourth preset angle; $\alpha_2$ denotes an angle between the plane formed by the first laser plane signal and the rotation axle, and is the third preset angle; $\theta=\theta_2-\theta_1$, $\theta_1$ denotes the first rotation angle, and $\theta_2$ denotes the second rotation angle.

The embodiment of the present disclosure further provides a computer-readable storage medium configured to store computer-executable instructions for executing any method described above.

Solutions provided by the embodiments of the present disclosure can convert the line laser signal emitted from the laser source to the two laser plane signals having a preset angle therebetween emitted by the emission grating in the positioning base station, so that the two laser plane signals scan the device to be positioned to position, which simplifies structure of the positioning base station, facilitates miniaturization of the positioning base station, reduces manufacturing cost, and has a high positioning accuracy.

The positioning system provided by embodiments of the present disclosure is not only suitable for outdoor positioning but also suitable for indoor positioning.

DETAILED DESCRIPTION

Figure 1:
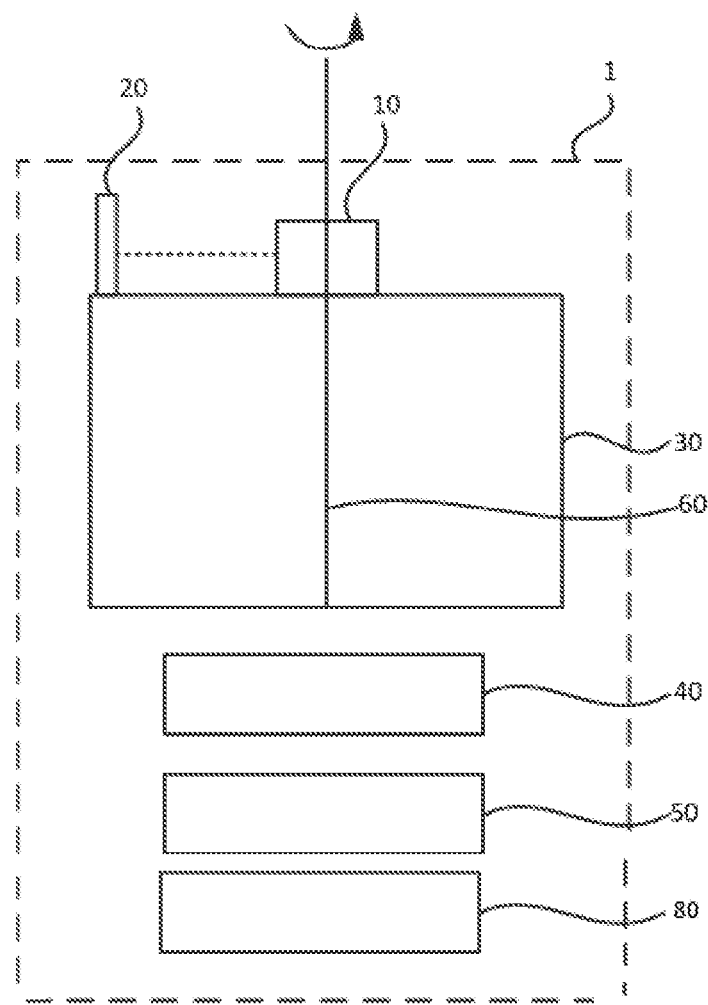
FIG. 1 is a structure diagram of a positioning base station according to an embodiment.

Hereinafter the present disclosure will be further described in detail in conjunction with the drawings and embodiments. It should be understood that, the specific embodiments set forth below are merely intended to illustrate and not to limit the present disclosure. It is to be noted that to facilitate description, only part, not all of content related to the present disclosure are illustrated in the drawings.

FIG. 1 is a structure diagram of a positioning base station according to an embodiment. As shown in FIG. 1, the positioning base station 1 includes: a rotating laser plane emitting unit, which is configured to rotate around a rotation axle 60 and emit two laser plane signals having a preset angle therebetween.

Optionally, the rotating laser plane emitting unit includes a laser source 10, an emission grating 20 and a driving device 30. The laser source 10 is configured to emit a line laser signal. The emission grating 20 is configured to convert the line laser signal emitted from the laser source to the two laser plane signals having a preset angle therebetween. The set angle may be any angle (the any angle does not include a case where the laser plane is perpendicular to the rotation axle), may be determined according to requirements, and the structure of the emission grating 20 may be determined according to the requirements. A driving device 30 is configured to drive the two laser plane signals emitted from the emission grating 20 to rotate around the rotation axle 60 so that the two laser plane signals scan the space separately.

The positioning base station 1 further includes: a distance measuring device 40 and a synchronization device 50. The distance measuring device 40 is configured to emit a distance measuring signal. For example, the distance measuring device may be an ultrasonic emission device, which is configured to emit an ultrasonic signal. The synchronization device 50 is configured to transmit a synchronization signal. The synchronization signal is configured to synchronize time of the positioning base station and the device to be positioned. The step in which the synchronization signal is configured to synchronize time of the positioning base station and the device to be positioned may include that: time at which the positioning base station transmits the synchronization signal may be obtained from time at which the device to be positioned receives the synchronization signal. The synchronization signal may be a radio frequency signal transmitted from a radio frequency transceiver chip, the time at which the device to be positioned receives the synchronization signal is affected by a transmission rate of the radio frequency transceiver chip. The higher the transmission rate of the radio frequency transceiver chip is, the shorter a defer period of receiving the synchronization signal is. For example, the transmission rate of the synchronization signal is 250 kbps, for example, the time at which receiving the synchronization signal is T1, the time at which the positioning base station transmits the synchronization signal is T2=T1-490 microseconds. In addition, time at which the positioning base station transmits the laser signal (that is, the two laser plane signals) and the distance measuring signal may be obtained according to the time at which the positioning base station transmits the synchronization signal. Optionally, the time of transmitting the laser signal and the time of transmitting the synchronization signal are equal or have a preset difference, and the time of transmitting the distance measuring signal and the time of transmitting the synchronization signal are equal or have a preset difference. For example, emit time of the laser signal T3=T2-1200 microseconds, and emit time of the distance measuring signal T4=T2.

Optionally, the distance measuring device 40 is disposed at an extension line of the rotation axle 60, and the distance measuring device 40 may also be disposed at other positions. Optionally, the driving device 30 is an electric motor. The rotation axle is a spindle of the electric motor, and the driving device 30 may also be other devices driving the laser plane signals emitted from the emission grating to rotate. The emission grating 20 is disposed at a turnplate circumference of the electric motor and rotate around the spindle of the electric motor. The laser source 10 may be disposed on the spindle of the electric motor, or may also be disposed on the turnplate of the electric motor. When the laser source 10 is disposed on the turnplate of the electric motor, a relative position of the laser source 10 and the emission grating 20 does not change and the laser source 10 may also be disposed at other positions as long as the line laser signal emitted from the laser source 10 is directly facing the surface of the emission grating.

The positioning base station 1 further includes a control device 80, which is configured to control a rotation speed of the rotating laser plane emitting unit, control the rotating laser plane emitting unit to emit the two laser plane signals and control the synchronization device to transmit the synchronization signal.

It is to be noted that a rotation direction of the rotation axle in FIG. 1 in the embodiment is exemplarily shown as a counterclockwise direction, but the rotation direction of the rotation axle may still be a clockwise direction. Also, in the embodiment, the distance measuring device is exemplarily disposed at the position shown in FIG. 1, but it is merely an example. In other embodiments of the present disclosure, the distance measuring device may be disposed at an intersection point between an intersection line of planes formed by the two laser plane signals and the rotation axle, or may also be disposed at other positions.

The distance measuring device 40 may be the ultrasonic emission device, an emission device of other types of sonic waves, a radio emission device, a laser emission device or an infrared emission device, and can perform a distance measuring.

Figure 2:
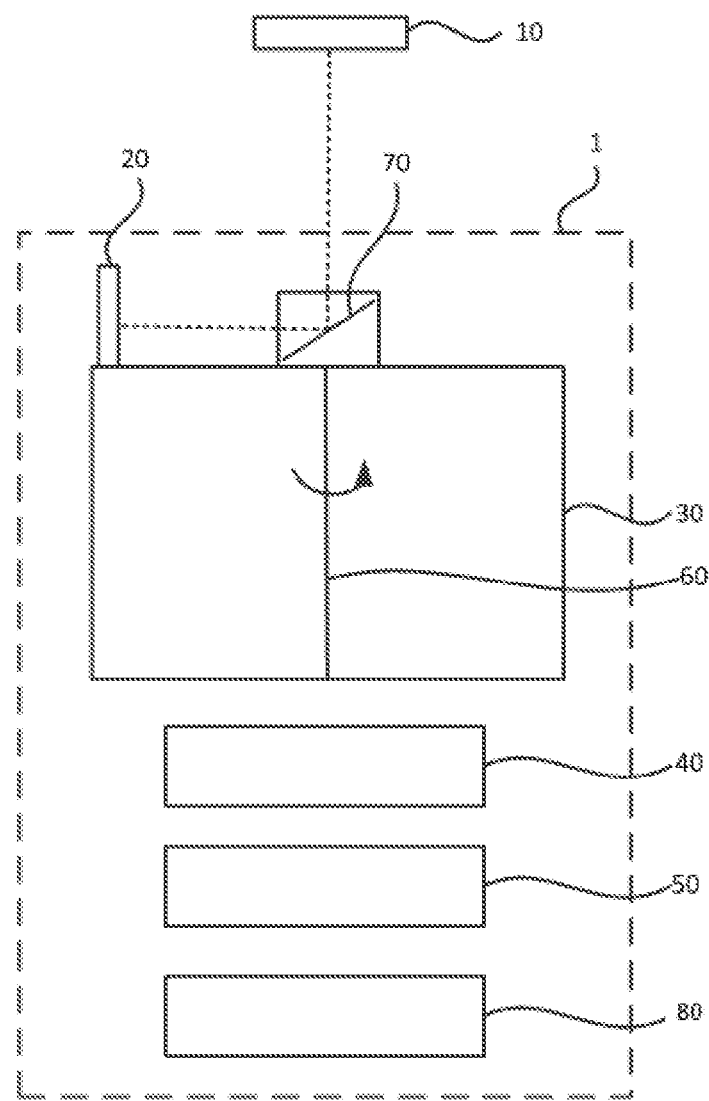
FIG. 2 is a structure diagram of another positioning base station according to an embodiment.

FIG. 2 is a structure diagram of the other positioning base station according to an embodiment. On the basis of the above embodiment, the positioning base station 1 includes a rotating laser plane emitting unit, a distance measuring device 40 and a synchronization device 50. Optionally, the rotating laser plane emitting unit includes a laser source 10, an emission grating 20 and a driving device 30 and an emission mirror 70. The emission mirror 70 is configured to change the direction of a line laser signal emitted from the laser source 10, and lead the line laser signal obtained after the emission direction is changed to the emission grating 20.

In this embodiment, optionally, the emission mirror 70 is configured to reflect the line laser signal emitted from the laser source 10, so that the reflected line laser signal is incident on the emission grating 20. The number of the emission mirrors 70 may be one or more. When the driving device 30 is an electric motor, the emission mirror is disposed on a spindle of the electric motor and rotates around the rotation of the spindle of the electric motor. The emission grating is disposed on a turnplate of the electric motor, and the relative position of the emission grating and the emission mirror does not change.

The positioning base station 1 further includes a control device 80, which is configured to control a rotation speed of the rotating laser plane emitting unit, control the rotating laser plane emitting unit to emit the two laser plane signals and control a first reference time at which the synchronization device to transmit the synchronization signal. Optionally, the control device is configured to control the rotation speed of electric motor, control the rotating laser plane emitting unit to emit the two laser plane signals and control the synchronization device to transmit the synchronization signal.

Figure 3A:
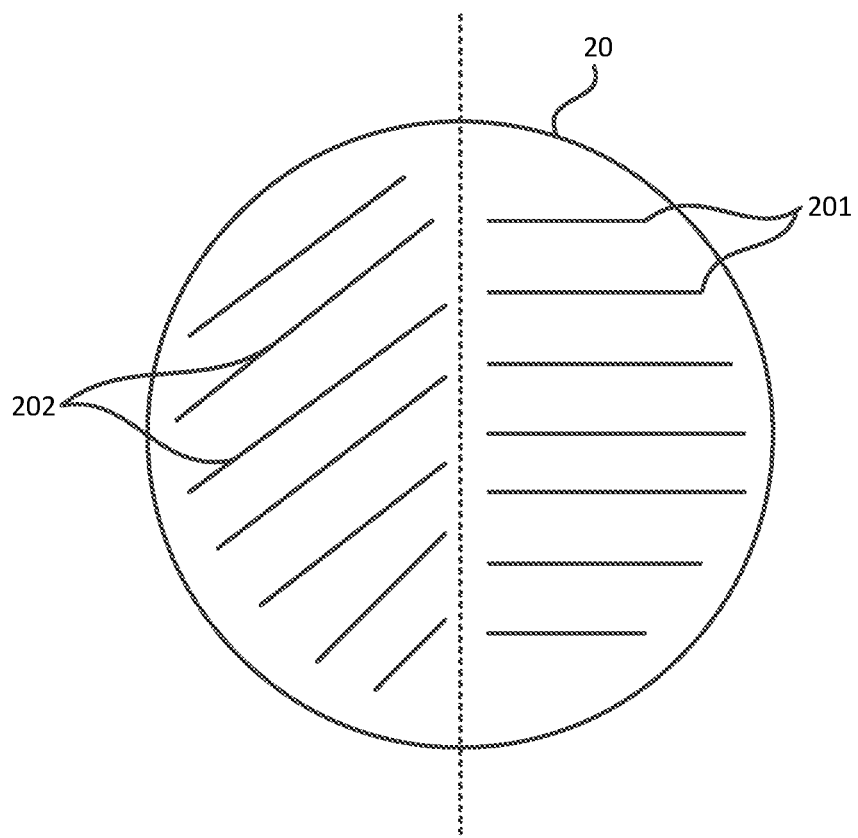
FIG. 3A is a front view of a wave lens according to an embodiment.

Optionally, the emission grating is an optical structure including a first portion and a second portion. The first portion is configured to convert the line laser signal emitted from the laser source to a first laser plane signal. The second portion is configured to convert the line laser signal emitted from the laser source to a second laser plane signal. The preset angle is formed between first laser plane signal and the second laser plane signal. Optionally, the optical structure is a wave lens. The wave lens includes the first portion and the second portion. The first portion includes multiple first wave lines, the multiple first wave lines are arranged in parallel. The first portion is configured to convert the line laser signal emitted from the laser source to the first laser plane signal. The second portion includes multiple second wave lines. The multiple second wave lines are arranged in parallel. The second portion is configured to convert the line laser signal emitted from the laser source to the second laser plane signal. The direction of the multiple first wave lines is different from that of the multiple second wave lines. The length of the first wave lines and the second wave lines may be configured according to the requirements. FIG. 3A is a front view of a wave lens according to an embodiment. As shown in FIG. 3A, optionally, the first wave lines 201 in the wave lens 20 are perpendicular to the direction in which the rotation axle is located. The second wave lines 202 in the wave lens 20 are disposed at 45° with respect to the direction in which the rotation axle is located. The vertical direction in FIG. 3A is the direction in which the rotation axle is located. The direction of the rotation axle parallels the direction in which the dotted line is located in FIG. 3A.

When the first wave lines are perpendicular to the direction in which the rotation axle is located, the plane formed by the first laser plane signal converted by the first portion of the wave mirror parallels the rotation axle. When the second wave lines are disposed at 45° with respect to the direction in which the rotation axle is located, the plane formed by the second laser plane signal converted by the second portion of the wave mirror is disposed at 45° with respect to the rotation axle.

Optionally, the first portion of the wave lens can extend the line laser signal incident on the first portion, and form the first laser plane signal, and the plane formed by the first laser plane signal is perpendicular to the first wave lines. The second portion of the wave lens can extend the line laser signal incident on the second portion, and form the second laser plane signal, and the plane formed by the second laser plane signal is perpendicular to the second wave lines.

Figure 3B:
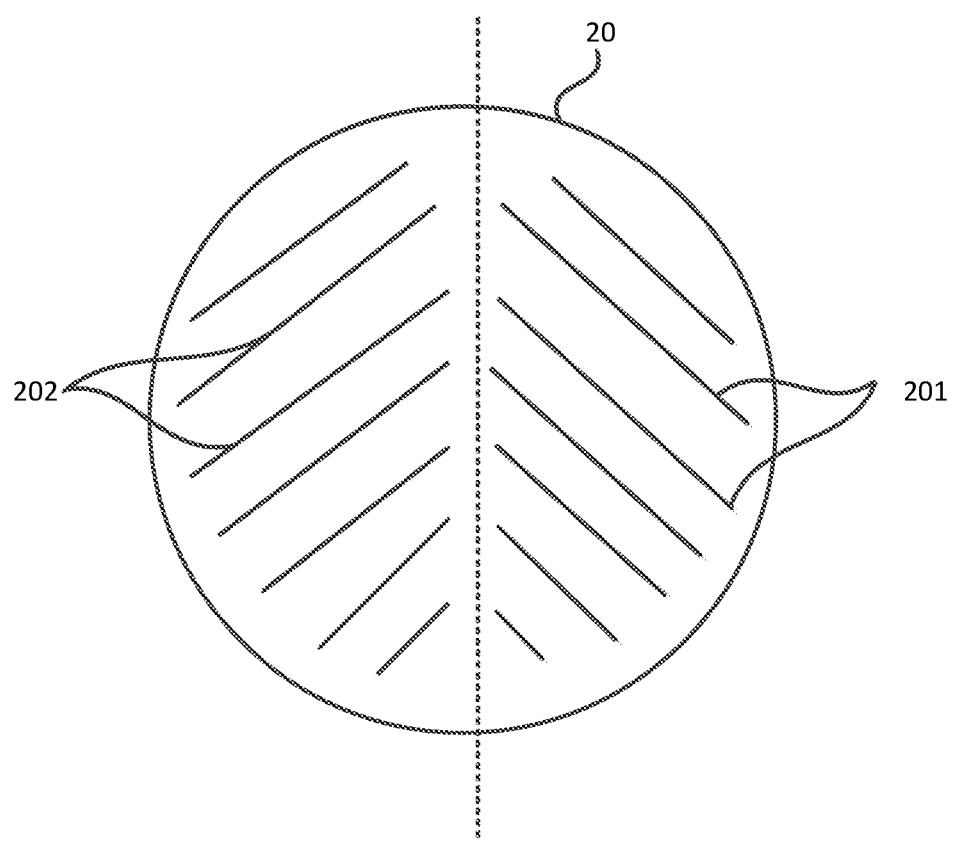
FIG. 3B is a front view of the other wave lens according to an embodiment.

FIG. 3B is a front view of the other wave lens according to an embodiment. As shown in FIG. 3B, the first wave lines 201 are disposed at 90° with respect to the second wave lines 202, and the angle between the first wave lines 201 and the rotation axle as well as the angle between the second wave lines 202 and the rotation axle are all 45°. The vertical direction in FIG. 3B is the direction in which the rotation axle is located. The direction of the rotation axle parallels the direction in which the dotted line is located in FIG. 3B.

When the first wave lines are disposed at 90° with respect to the second wave lines, and the included angle between the first wave lines 201 and the rotation axle as well as the included angle between the second wave lines 202 and the rotation axle are all 45°, the plane formed by the first laser plane signal is disposed at 90° with respect to the plane formed by the second laser plane signal, and the plane formed by the first laser plane signal and the plane formed by the second laser plane signal are all disposed at 45° with respect to the rotation axle. The first wave lines are perpendicular to the plane formed by the first laser plane signal, and the second wave lines are perpendicular to the plane formed by the second laser plane signal.

Figure 3C:
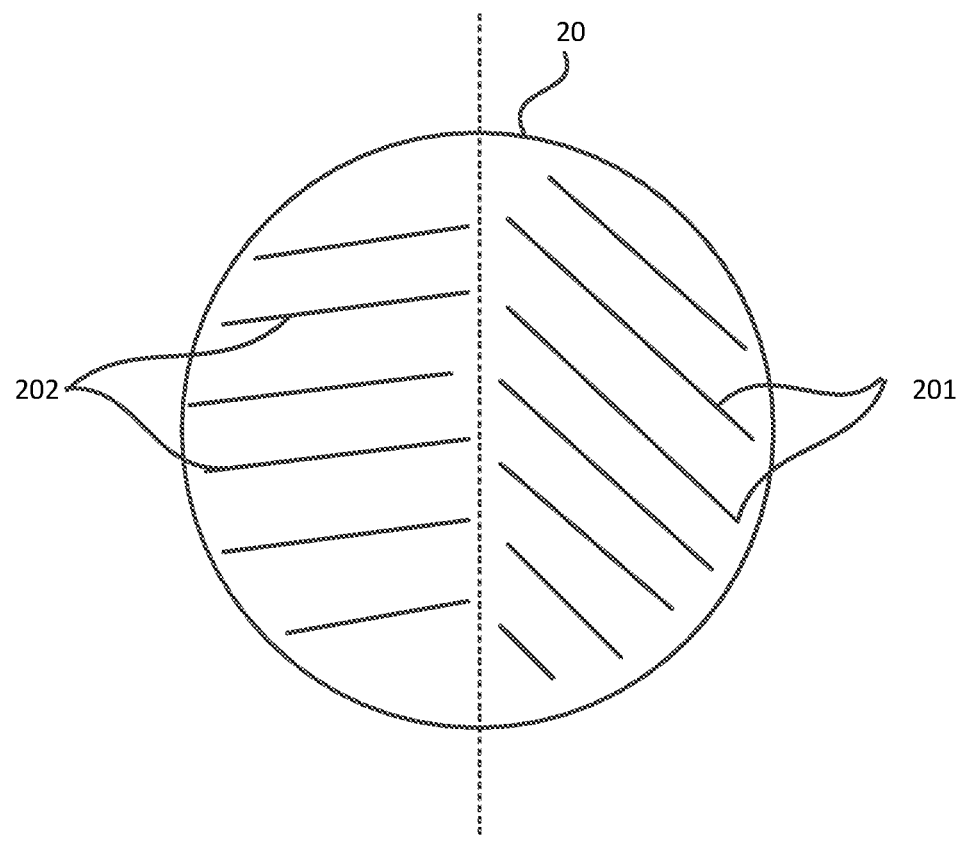
FIG. 3C is a front view of the other wave lens according to an embodiment.

FIG. 3C is a front view of another wave lens according to an embodiment. As shown in FIG. 3C, the first wave lines 201 in the wave lens 20 are disposed at a first preset angle with respect to the direction in which the rotation axle is located. The second wave lines 202 are disposed at a second preset angle with respect to the direction in which the rotation axle is located. The vertical direction in FIG. 3C is the direction in which the rotation axle is located. The direction of the rotation axle parallels the direction in which the dotted line is located in FIG. 3C.

When the first wave lines in the wave lens are disposed at the first preset angle with respect to the direction in which the rotation axle is located and the second wave lines are disposed at the second preset angle with respect to the direction in which the rotation axle is located, the plane formed by the first laser plane signal is disposed at a third preset angle with respect to the rotation axle, and the plane formed by the second laser plane signal is disposed at a fourth preset angle with respect to the rotation axle. The sum of the first preset angle and the third preset angle is 90°, and the sum of the second preset angle and the fourth preset angle is 90°. The first preset angle and the second preset angle are not intended to be limited, and may be set according to the needs. The first preset angle and the second preset angle cannot be 90°.

It is to be noted that the embodiment of the present disclosure adopts the structures of the wave lens shown in FIGS. 3A to 3C to describe, but in other embodiments of the present disclosure, the structure of the wave lens may also be other forms as long as by which the purpose that the line laser signal is converted to the two laser plane signals at the set angle can be implemented. The wave lens is a left-right structure, and may also be an upper-lower structure. The wave lines in an upper portion are disposed at a first angle with respect to the rotation axle, and the wave lines in a lower portion are disposed at a second angle with respect to the rotation axle. The first angle and the second angle both cannot be 0°.

It is to be noted that the optical structure may also be other structures as long as by which the line laser signal is converted to the two laser plane signals having the preset angle therebetween. For example, the optical structure may also be a convex lens.

By adopting the above emission grating, the line laser signal is converted to the two laser plane signals having the preset angle therebetween, so that the two laser plane signals scan the space and position a device to be positioned in the space.

Figure 4:
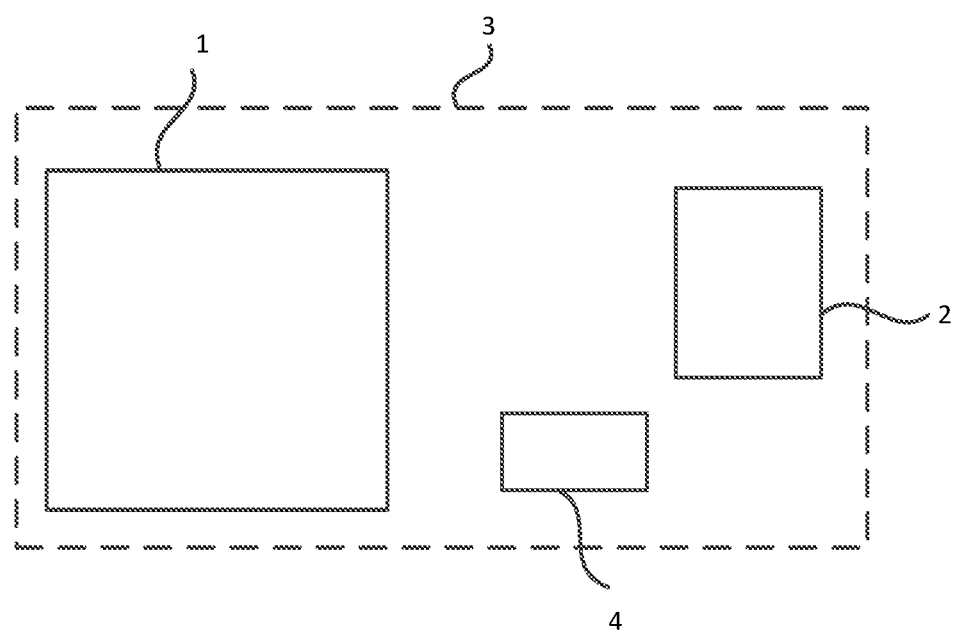
FIG. 4 is a structure diagram of a positioning system according to an embodiment.

FIG. 4 is a structure diagram of a positioning system according to an embodiment. The positioning system 3 includes a positioning base station 1, a device to be positioned 2 and a calculation device 4.

The device to be positioned 2 is configured to receive a synchronization signal transmitted from the synchronization device in the positioning base station 1, two laser plane signals emitted at a set angle in the positioning base station 1 and a distance measuring signal emitted from a distance measuring device, and record a first reference time at which the synchronization signal is received, a first time and a second time at which the two laser plane signals are respectively received and a third time at which the distance measuring signal is received, respectively.

The calculation device 4 which is configured to determine, according to the first reference time, the first time, the second time and a rotation speed of a rotating laser plane emitting unit in the positioning base station 1, a first rotation angle of a target laser plane rotating based on the first reference time to the first time, and a second rotation angle of the target laser plane rotating based on the first reference time to the second time. The target laser plane is a plane formed by a laser plane signal that firstly scans the device to be positioned in the two laser plane signals.

The calculation device 4 which is configured to determine, according to a second reference time at which the positioning base station emits the distance measuring signal and the third time, the distance between the device to be positioned and the positioning base station.

The calculation device 4 which is configured to determine, according to the first rotation angle, the second rotation angle as well as the distance between the device to be positioned 2 and the positioning base station 1, the position of the device to be positioned 2.

In the embodiment, optionally, the device to be positioned includes a synchronization signal receiving device, an photoelectric sensing circuit and a distance measuring signal receiving device. The synchronization signal receiving device is configured to receive the synchronization signal. The photoelectric sensing circuit is configured to receive the two laser plane signals, and record the first time and the second time at which the two laser plane signals are received. The distance measuring signal receiving device is configured to receive the distance measuring signal and record the third time at which the distance measuring signal is received, respectively.

The calculation device 4 may be integrally configured with the device to be positioned 2, and directly calculate, according to the first reference time, the second reference time, the first time, the second time, the third time obtained from the device to be positioned 2 and a preset rotation speed of a driving device in the positioning base station, a spatial position of the device to be positioned 2. The calculation device 4 and the device to be positioned 2 may also be separately configured. The device to be positioned 2 transmits the above information to the calculation device in a wired or wireless manner to calculate and obtain the spatial position of the device to be positioned 2.

The positioning method adopting the above positioning system will be described below in detail. By adopting above positioning system, the structure is simplified, the manufacturing cost and control difficulty are reduced and the positioning is accurate.

Figure 5:
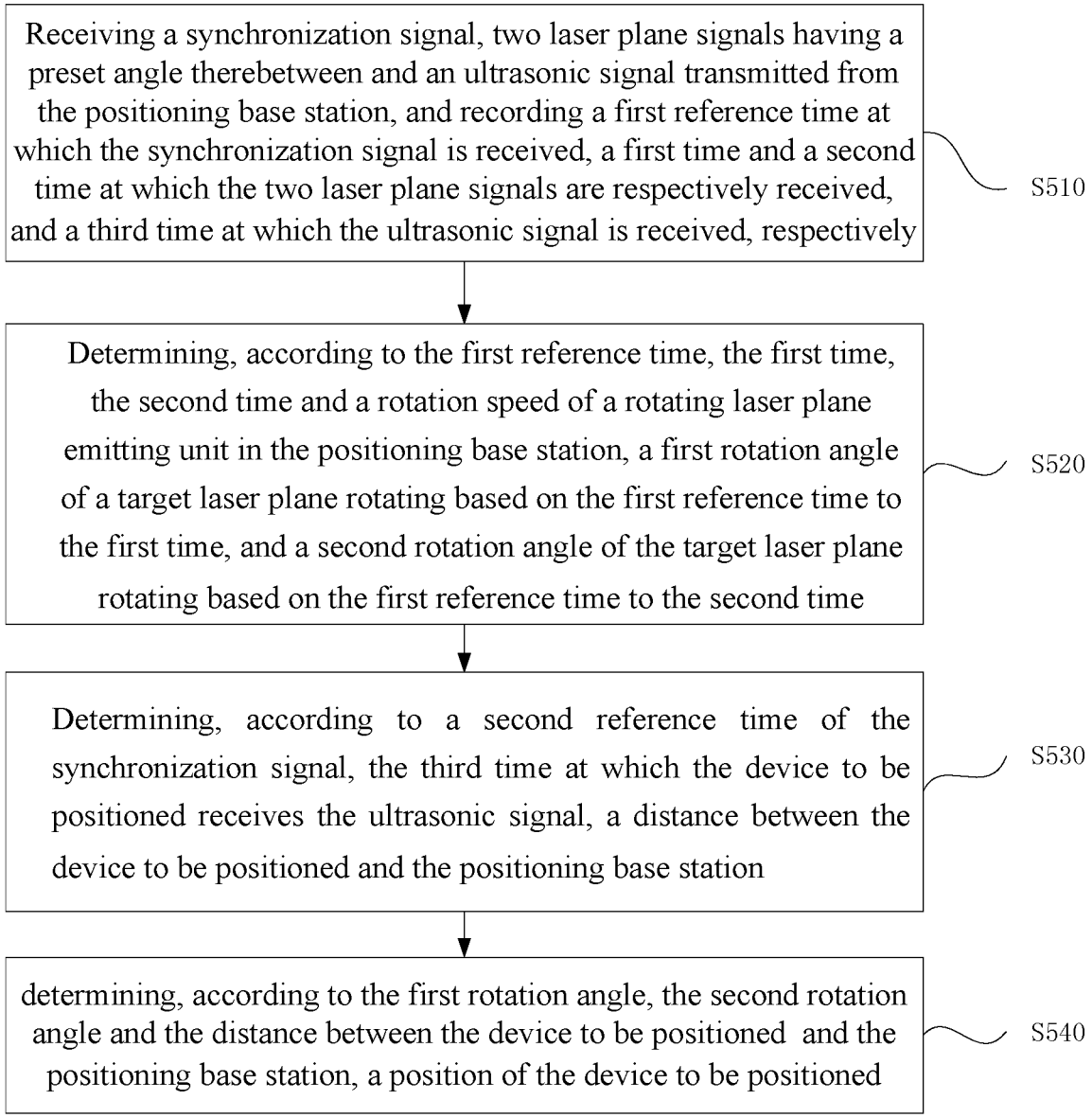
FIG. 5 is a flowchart of a positioning method according to an embodiment.

FIG. 5 is a flowchart of a positioning method according to an embodiment. The method may be executed by the positioning system provided by the embodiment. The method includes steps S510 to S540.

In step S510, a device to be positioned receives a synchronization signal, two laser plane signals having a preset angle therebetween and a distance measuring signal transmitted from a positioning base station, and records a first reference time at which the synchronization signal is received, a first time and a second time at which the two laser plane signals are respectively received and a third time at which the distance measuring signal is received, respectively.

In this embodiment, the synchronization signal is transmitted from a synchronization device in the positioning base station. The distance measuring signal is emitted from a distance measuring device in the positioning base station. A first reference time at which the synchronization signal is received and a second reference time at which the distance measuring signal is emitted are obtained according to transmission time of the synchronization signal. The first time and the second time are time at which the two laser plane signals respectively scan the device to be positioned, and the first time is earlier than the second time. The first reference time and the second reference time may be the same or different. The second reference time may be the emission time of the distance measuring signal obtained based on the transmission time of the synchronization signal and a set fixed time difference. If the distance measuring device is an ultrasonic emission device, then the distance measuring signal is an ultrasonic signal.

In step S520, the calculation device determines, according to the first reference time, the first time, the second time and a rotation speed of a rotating laser plane emitting unit in the positioning base station, a first rotation angle of a target laser plane rotating based on the first reference time to the first time, and a second rotation angle of the target laser plane rotating based on the first reference time to the second time.

In the embodiment, the target laser plane is the laser plane that firstly scans the device to be positioned in the two laser plane signals.

The first rotation angle of the target laser plane rotating based on the first reference time to the first time, and the second rotation angle of the target laser plane rotating based on the first reference time to the second time may be: the first rotation angle of the target laser plane rotating from the first reference time to the first time, and the second rotation angle of the target laser plane rotating from the first reference time to the second time; or the first rotation angle of the target laser plane rotating from a reference time set on the basis of the first reference time to the first time, and the second rotation angle of the target laser plane rotating from the reference time set on the basis of the first reference time to the second time. Optionally, a preset difference exists between the reference time and the first reference time.

In step 530, the calculation device determines, according to the second reference time at which the distance measuring signal is emitted and the third time at which the device to be positioned receives the distance measuring signal, a distance between the device to be positioned and the positioning base station.

In the embodiment, since the time emitting the distance measuring signal is the second reference time and the time receiving the distance measuring signal is the third time, the travel time of the distance measuring signal is determined by the third time and the second reference time. The distance between the distance measuring device and the device to be positioned, that is, the distance between the device to be positioned and the positioning base station is determined based on the travel time of the distance measuring signal and a travel speed of the distance measuring signal.

Optionally, if the distance measuring signal is the ultrasonic signal and is emitted from the ultrasonic emission device, then since the time transmitting the ultrasonic signal is the second reference time and the time receiving the ultrasonic signal is the third time, the travel time of the ultrasonic signal is determined by the third time and the second reference time. The distance between the ultrasonic emission device and the device to be positioned, that is, the distance between the positioning base station and the device to be positioned is determined based on the travel time of the ultrasonic signal and a travel speed of the ultrasonic signal.

In step 540, the position of the device to be positioned is determined based on the first rotation angle, the second rotation angle and the distance between the device to be positioned and the positioning base station.

In the embodiment, when a plane formed by the first laser plane signal parallels the rotation axle and a plane formed by the second laser plane signal is disposed at 45° with respect to the rotation axle, (the first laser plane signal and the second laser plane signal are formed by the wave lens shown in FIG. 3A), optionally, the step in which the position of the device to be positioned is determined based on the first rotation angle, the second rotation angle and the distance between the device to be positioned and the positioning base station includes:

determining the position of the device to be positioned based on the following formula:

$$x = \frac{l\cos\theta_1}{\sqrt{1 + \sin^2(\theta)}}$$

$$y = \frac{l\sin(\theta)}{\sqrt{1 + \sin^2(\theta)}}$$

$$z = \frac{l\sin\theta_1}{\sqrt{1 + \sin^2(\theta)}};$$

where x denotes a coordinate of the device to be positioned in a direction of X-axis, y denotes a coordinate of the device to be positioned in a direction of Y-axis, z denotes a coordinate of the device to be positioned in a direction of Z-axis; l denotes the distance between the device to be positioned and the positioning base station; $\theta=\theta_2-\theta_1$, $\theta_1$ denotes the first rotation angle, and $\theta_2$ denotes the second rotation angle.

Figure 6A:
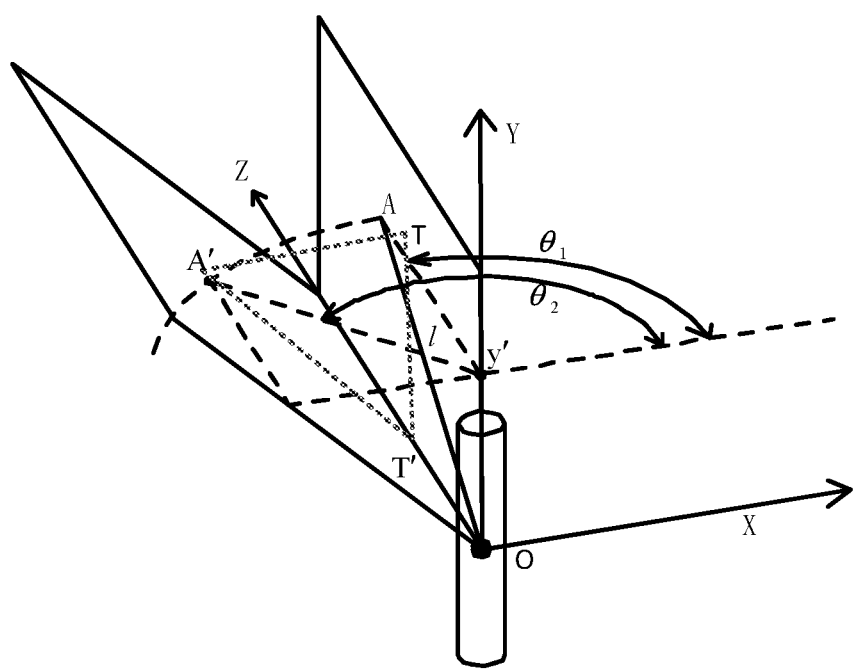
FIG. 6A is a schematic diagram of a positioning method according to an embodiment.

As shown in FIG. 6A, a spindle in a driving device is configured a direction of the Y-axis, so a rotation axle is in the direction of Y-axis and a distance measuring device (such as an ultrasonic emission device) is located in a position of the origin. When the rotation axle rotates counterclockwise, $\theta_1$ denotes the angle of the plane formed by the second laser plane signal rotating from the first reference time to the first time, and the angle of the plane formed by the second laser plane signal rotating from the first reference time to the time at which the plane formed by the second laser plane signal scans the device to be positioned. $\theta_2$ denotes the angle of the plane formed by the second laser plane signal rotating from the first reference time to the second time, and the angle of the plane formed by the first laser plane signal rotating from the first reference time to the time at which the plane formed by the first laser plane signal scans the device to be positioned. When the rotation axle rotates clockwise, $\theta_1$ denotes the angle of the plane formed by the first laser plane signal rotating from the first reference time to the first time, and the angle of the plane formed by the first laser plane signal rotating from the first reference time to the time at which the plane formed by the first laser plane signal scans the device to be positioned. $\theta_2$ denotes the angle of the plane formed by the first laser plane signal rotating from the first reference time to the second time, and the angle of the plane formed by the second laser plane signal rotating from the first reference time to the time at which the plane formed by the second laser plane signal scans the device to be positioned. The first time is earlier than the second time.

The calculation process of the position of the device to be positioned is as follows: using the rotation axle rotating counterclockwise as an example, as shown in FIG. 6A, Y-axis is the direction in which the rotation axle is located. An A point denotes the device to be positioned. An AOY plane denotes the plane formed by the first laser plane signal. The plane formed by the first laser plane signal parallels the rotation axle. An A' point denotes a scanning position of the device to be positioned A on the plane formed by the second laser plane signal. An A' OZ plane denotes the plane formed by the second laser plane signal. The plane formed by the second laser plane signal is disposed at 45° with respect to the rotation axle. $\theta_1$ denotes the angle of the plane formed by the second laser plane signal rotating from the first reference time to the first time. If the first reference time is T0 and the first time is T1, then $\theta_1=(T1-T0)\times w$, where w denotes the rotation speed of the driving device. $\theta_2$ denotes the angle of the plane formed by the second laser plane signal rotating from the first reference time to the second time. If the second time is T2, then $\theta_2=(T2-T0)\times w$.

When the rotation axle rotates counterclockwise, the first time is the time at which the plane formed by the second laser plane signal scans the device to be positioned. The second time is the time at which the plane formed by the first laser plane signal scans the device to be positioned. That is, the first time is the time receiving the second laser plane signal and the second time is the time receiving the first laser plane signal. As shown in FIG. 6A, y' is a projection of the A' point on Y-axis, and in an A'y'O triangle, $A'y'^2+Oy'^2=A'O^2$. A perpendicular line is made from the A' point to a YOZ plane, a perpendicular point is T, and T' is a projection of the T point on an XOZ plane. Then in an A'TT' triangle, due to $\angle A'TT'A'=45°$ and $\angle A'TT'=90°$, so the A'TT' triangle is an isosceles right triangle and $A'T=TT'$. In an A'Ty' triangle, $$\sin\theta = \frac{A'T}{A'y'},$$

coordinate values of the A point in the direction of Y-axis respectively equal to Oy and TT', $A'O=AO=1$. Therefore, $A'y'^2+y^2=1^2$ and $$\frac{y}{A'y'} = \sin\theta$$

are obtained, and y is calculated. Similarly, x and z may also be obtained, and will not be described again.

In the embodiment, when the plane formed by the first laser plane signal is disposed at 90° with respect to the plane formed by the second laser plane signal, and the plane formed by the first laser plane signal and the plane formed by the second laser plane signal are all disposed at 45° with respect to the rotation axle, (the first laser plane signal and the second laser plane signal are formed by the wave lens shown in FIG. 3B), optionally, the step in which the position of the device to be positioned is determined based on the first rotation angle, the second rotation angle and the distance between the device to be positioned and the positioning base station includes:

determining the position of the device to be positioned based on the following formula:

$$x = \frac{l\cos\theta_1}{\sqrt{1+\sin^2\left(\frac{\theta}{2}\right)}}$$

$$y = \frac{l\sin\left(\frac{\theta}{2}\right)}{\sqrt{1+\sin^2\left(\frac{\theta}{2}\right)}}$$

$$z = \frac{l\sin\theta_1}{\sqrt{1+\sin^2\left(\frac{\theta}{2}\right)}}.$$

Where x denotes a coordinate of the device to be positioned in a direction of X-axis, y denotes a coordinate of the device to be positioned in a direction of Y-axis, z denotes a coordinate of the device to be positioned in a direction of Z-axis; 1 denotes the distance between the device to be positioned and the positioning base station; $\theta=\theta_2-\theta_1$, $\theta_1$ denotes the first rotation angle, and $\theta_2$ denotes the second rotation angle.

Figure 6B:
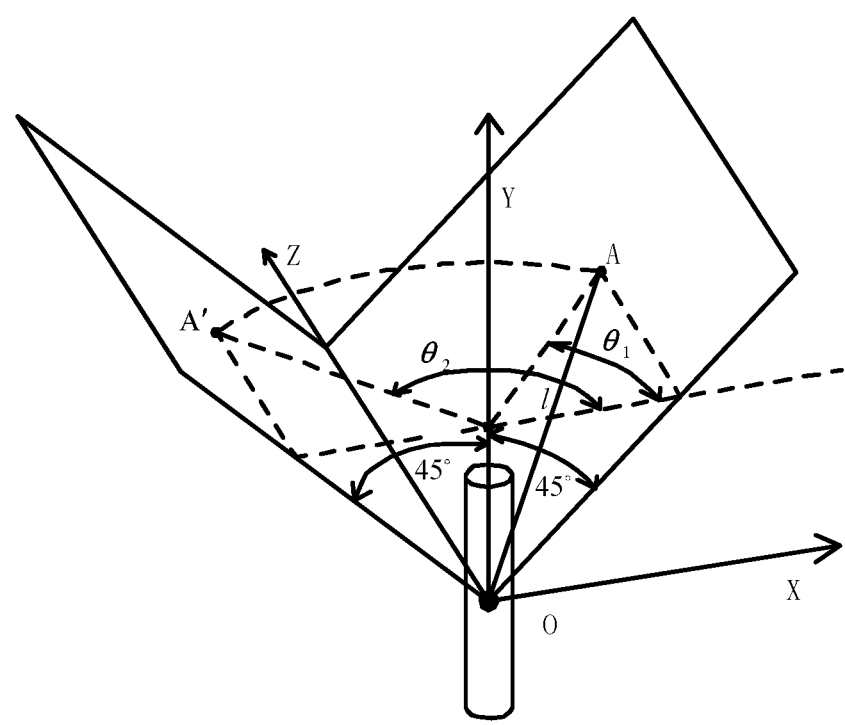
FIG. 6B is a schematic diagram of another positioning method according to an embodiment.

As shown in FIG. 6B, a spindle in a driving device is a direction of the Y-axis, so a rotation axle is in the direction of Y-axis and a distance measuring device (such as an ultrasonic emission device) is located in a position of the origin. When the rotation axle rotates clockwise, $\theta_1$ denotes the angle of the plane formed by the first laser plane signal rotating from the first reference time to the first time, and the angle of the plane formed by the first laser plane signal rotating from the first reference time to the time at which the plane formed by the first laser plane signal scans the device to be positioned. $\theta_2$ denotes the angle of the plane formed by the first laser plane signal rotating from the first reference time to the second time, and the angle of the plane formed by the second laser plane signal rotating from the first reference time to the time at which the plane formed by the second laser plane signal scans the device to be positioned. When the rotation axle rotates counterclockwise, $\theta_2$ denotes the angle of the plane formed by the second laser plane signal rotating from the first reference time to the first time, and the angle of the plane formed by the second laser plane signal rotating from the first reference time to the time at which the plane formed by the second laser plane signal scans the device to be positioned. $\theta_2$ denotes the angle of the plane formed by the second laser plane signal rotating from the first reference time to the second time, and the angle of the plane formed by the first laser plane signal rotating from the first reference time to the time at which the plane formed by the first laser plane signal scans the device to be positioned.

As shown in FIG. 6B, the calculation method of the position of the device to be positioned is the same with the calculation method of the position of the device to be positioned in FIG. 6A. Y-axle is the direction in which the rotation axle is located. The rotation axle rotates around the counterclockwise direction. An A point denotes the device to be positioned. An AOY plane denotes the plane formed by the first laser plane signal. The plane formed by the first laser plane signal is disposed at 45° with respect to the rotation axle. An A' point denotes a scanning position of the device to be positioned A on the plane formed by the second laser plane signal. An A'OZ plane denotes the plane formed by the second laser plane signal. The plane formed by the second laser plane signal is disposed at 45° with respect to the rotation axle. By drawing an auxiliary plane in parallel with the rotation axle with respect to an intersection line between the plane formed by the first laser plane signal and the plane formed by the second laser plane signal, and by using 45° angles of the plane formed by the first laser plane signal and the plane formed by the second laser plane signal with respect to the rotation axle and the geometrical relationship, coordinates of the device to be positioned A are obtained.

In the embodiment, when the plane formed by the first laser plane signal is disposed at a third preset angle with respect to the rotation axle, the plane formed by the second laser plane signal is disposed at a fourth preset angle with respect to the rotation axle, (the first laser plane signal and the second laser plane signal are formed by the wave lens shown in FIG. 3C), optionally, the step in which the position of the device to be positioned is determined based on the first rotation angle, the second rotation angle and the distance between the device to be positioned and the positioning base station includes:

determining the position of the device to be positioned based on the following formula:

$x = r \cos \theta_1$ $y = r \sin \beta_1 \cot \alpha_1$ $z = r \sin \theta_1$;

x denotes a coordinate of the device to be positioned in a direction of X-axis, y denotes a coordinate of the device to be positioned in a direction of Y-axis, z denotes a coordinate of the device to be positioned in a direction of Z-axis; l denotes the distance between the device to be positioned and the positioning base station;

$$\beta_1 = \arctan\left(\frac{\sin\theta\cot\alpha_2}{\cot\alpha_1 + \cos\theta\cot\alpha_2}\right), \quad r = \frac{l}{\sqrt{1 + \sin^2\beta_1 \cot^2\alpha_1}},$$

$\alpha_1$ denotes an angle between the plane formed by the second laser plane signal and the rotation axle, and is the fourth preset angle; $\alpha_2$ denotes an angle between the plane formed by the first laser plane signal and the rotation axle, and is the third preset angle; $\theta = \theta_2 - \theta_1$, $\theta_1$ denotes the first rotation angle, and $\theta_2$ denotes the second rotation angle.

When the rotation axle rotates clockwise, $\theta_1$ denotes the first rotation angle, that is, the angle of the plane formed by the first laser plane signal rotating from the first reference time to the first time, and the angle of the plane formed by the first laser plane signal rotating from the first reference time to the time at which the plane formed by the first laser plane signal scans the device to be positioned. $\theta_2$ denotes the second rotation angle, that is, the angle of the plane formed by the first laser plane signal rotating from the first reference time to the second time, and the angle of the plane formed by the second laser plane signal rotating from the first reference time to the time at which the plane formed by the second laser plane signal scans the device to be positioned.

Alternatively, when the rotation axle rotates counterclockwise, $\theta_1$ denotes the angle of the plane formed by the second laser plane signal rotating from the first reference time to the first time, and the angle of the plane formed by the second laser plane signal rotating from the first reference time to the time at which the plane formed by the second laser plane signal scans the device to be positioned. $\theta_2$ denotes the angle of the plane formed by the second laser plane signal rotating from the first reference time to the second time, and the angle of the plane formed by the first laser plane signal rotating from the first reference time to the time at which the plane formed by the first laser plane signal scans the device to be positioned.

Figure 6C:
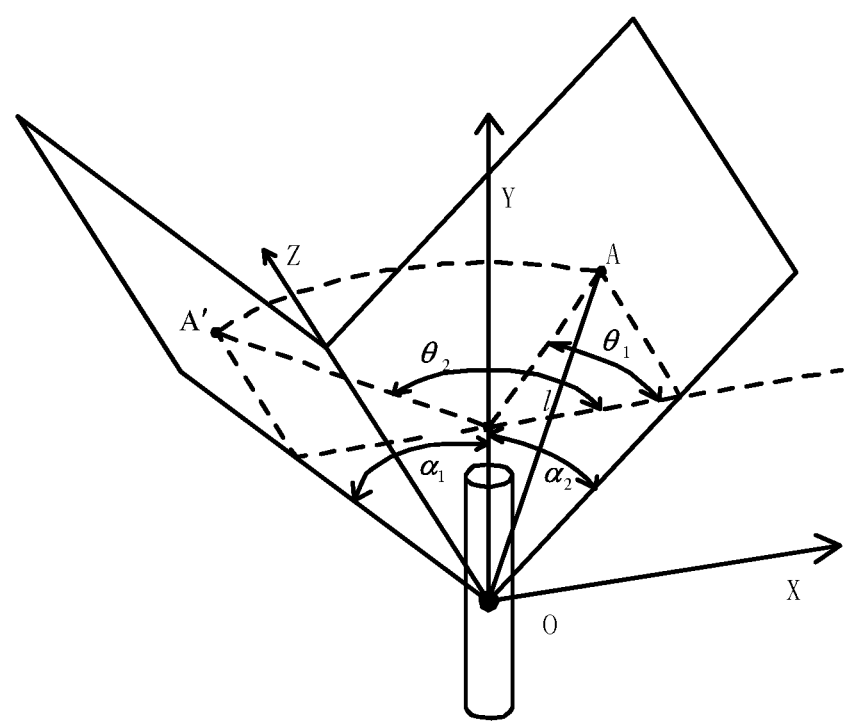
FIG. 6C is a schematic diagram of the other positioning method according to an embodiment.

As shown in FIG. 6C, taking the rotation axle rotating counterclockwise as an example, Y-axis is the direction in which the rotation axle is located. An A point denotes the device to be positioned. An AOY plane denotes the plane formed by the first laser plane signal. An included angle between the plane formed by the first laser plane signal and the rotation axle is $\alpha_2$. An A' point denotes a scanning position of the device to be positioned A on the plane formed by the second laser plane signal. An A'OZ plane denotes the plane formed by the second laser plane signal. An included angle between the plane formed by the second laser plane signal and the rotation is $\alpha_1 \cdot \theta_1$ denotes the angle of the plane formed by the second laser plane signal rotating from the first reference time to the first time. If the first reference time is T0 and the first time is T1, then $\theta_1 = (T1-T0) \times w$, where w denotes the rotation speed of the driving device, $\theta_2$ denotes the angle of the plane formed by the second laser plane signal rotating from the first reference time to the second time. If the second time is T2, then $\theta_2 = (T2-T0) \times w$.

The first time is the time at which the plane formed by the second laser plane signal scans the device to be positioned and the second time is the time at which the plane formed by the first laser plane signal scans the device to be positioned. As shown in FIG. 6C, by drawing an auxiliary plane in parallel with the rotation axle with respect to an intersection line between the plane formed by the first laser plane signal and the second laser plane signal, and by using angles of the plane formed by the first laser plane signal and the plane formed by the second laser plane signal respectively with respect to the rotation axle and the geometrical relationship, coordinates of the device to be positioned A are obtained.

It is to be noted that in detailed description of the embodiments of the present disclosure, to facilitate description, schematic diagrams illustrating device structures and positioning principles are not partially enlarged in accordance with a general proportional scale, and the description is merely examples and is not intended to limit the scope of the present disclosure.

Positioning by a positioning system with an emission grating reduces the manufacturing cost, simplifies the control system and has a relatively high positioning accuracy.

The embodiment of the present disclosure further provides a computer-readable storage medium, which is configured to a positioning base station and configured to store computer-executable instructions for executing positioning-base-station-side methods described in the above embodiments.

The embodiment of the present disclosure further provides a computer-readable storage medium, which is configured to a device to be positioned and configured to store computer-executable instructions for executing the space-to-be-positioned-device-side methods described in the above embodiments. The embodiment of the present disclosure further provides a computer-readable storage medium, which is configured to a calculation device and configured to store computer-executable instructions for executing the calculation-device-side methods described in the above embodiments.

The computer-readable storage medium described in the above multiple embodiments may be a non-transient storage medium, such as a USB flash disk, mobile hard disk, read-only memory (ROM), random access memory (RAM), magnetic disk, compact disk or another medium that can store program codes, or may be a transient storage medium.

INDUSTRIAL APPLICABILITY

The present disclosure can convert the line laser signal emitted from the laser source to the two laser plane signals having a preset angle therebetween by the emission grating in the positioning base station, so that the two laser plane signals scan the device to be positioned, which simplifies structure of the positioning base station, facilitates miniaturization of the positioning base station, reduces manufacturing cost, and has a high positioning accuracy.

What is claimed is:

1. A positioning base station, comprising: a rotating laser plane emitting unit, a distance measuring device and a synchronization device;
    wherein the rotating laser plane emitting unit comprises a laser source, an emission grating and a driving device, the rotating laser plane emitting unit is configured to rotate around a rotation axle and emit two laser plane signals having a preset angle therebetween, and the two laser plane signals are configured to scan a space;
    wherein the laser source is configured to emit a line laser signal;
    wherein the emission grating is configured to convert the line laser signal emitted from the laser source to the two laser plane signals having the preset angle therebetween;
    wherein the driving device is configured to drive the two laser plane signals emitted from the emission grating to rotate around the rotation axle so that the two laser plane signals scan the space separately;
    wherein the distance measuring device is configured to emit a distance measuring signal, wherein the distance measuring signal is configured to measure a distance between the positioning base station and a device to be positioned; and
    wherein the synchronization device is configured to transmit a synchronization signal, wherein the synchronization signal is configured to synchronize time of the positioning base station and the device to be positioned.

2. The positioning base station according to claim 1, further comprising a control device, which is configured to control a rotation speed of the rotating laser plane emitting unit, control the rotating laser plane emitting unit to emit the two laser plane signals and control the synchronization device to transmit the synchronization signal.

3. The positioning base station according to claim 1, wherein the rotating laser plane emitting unit further comprises an emission mirror, wherein the emission mirror is configured to change an emission direction of the line laser signal emitted from the laser source, and lead the line laser signal obtained after the emission direction is changed to the emission grating.

4. The positioning base station according to claim 3, wherein the emission grating is an optical structure comprising a first portion and a second portion;
    the first portion is configured to convert the line laser signal emitted from the laser source to a first laser plane signal;
    the second portion is configured to convert the line laser signal emitted from the laser source to a second laser plane signal;
    wherein the first laser plane signal and the second laser plane signal have the preset angle there between.

5. The positioning base station according to claim 1, wherein the emission grating is an optical structure comprising a first portion and a second portion;
    wherein the first portion is configured to convert the line laser signal emitted from the laser source to a first laser plane signal;
    wherein the second portion is configured to convert the line laser signal emitted from the laser source to a second laser plane signal;
    wherein the first laser plane signal and the second laser plane signal have the preset angle there between.

6. The positioning base station according to claim 5, wherein the optical structure is a wave lens;
    wherein the first portion comprises a plurality of first wave lines, and the plurality of first wave lines are arranged in parallel; and
    wherein the second portion comprises a plurality of second wave lines, and the plurality of second wave lines are arranged in parallel,
    wherein a direction of the plurality of first wave lines is different from that of the plurality of second wave lines.

7. The positioning base station according to claim 1, wherein the distance measuring device is an ultrasonic emission device, which is configured to emit an ultrasonic signal.

8. A positioning system, comprising a positioning base station, a device to be positioned according to and a calculation device;
    wherein positioning base station comprises: a rotating laser plane emitting unit, a distance measuring device and a synchronization device;
    wherein the rotating laser plane emitting unit is configured to rotate around a rotation axle and emit two laser plane signals having a preset angle there between, and the two laser plane signals are configured to scan a space;
    wherein the distance measuring device is configured to emit a distance measuring signal, wherein the distance measuring signal is configured to measure a distance between the positioning base station and a device to be positioned; and
    wherein the synchronization device is configured to transmit a synchronization signal, wherein the synchronization signal is configured to synchronize time of the positioning base station and the device to be positioned;
    wherein the device to be positioned is configured to receive the synchronization signal transmitted from the synchronization device in the positioning base station, the two laser plane signals having the preset angle there between emitted from the positioning base station, and a distance measuring signal emitted from a distance measuring device, and record a first reference time at which the synchronization signal is received, a first time and a second time at which the two laser plane signals are respectively received, and a third time at which the distance measuring signal is received, respectively;

wherein the calculation device is configured to determine, according to the first reference time, the first time, the second time and a rotation speed of the rotating laser plane emitting unit in the positioning base station, a first rotation angle of a target laser plane rotating based on the first reference time to the first time, and a second rotation angle of the target laser plane rotating based on the first reference time to the second time;

wherein the target laser plane is a plane in which a laser plane signal that firstly scans the device to be positioned in the two laser plane signals is located; and the calculation device, which is further configured to determine, according to a second reference time at which the distance measuring signal is emitted, the third time at which the device to be positioned receives the distance measuring signal and a travel speed of the distance measuring signal in a space, a distance between the device to be positioned and the positioning base station; and determine, according to the first rotation angle, the second rotation angle and the distance between the device to be positioned and the positioning base station, a position of the device to be positioned.

9. The positioning system according to claim 8, wherein the calculation device and the device to be positioned are integrally configured.

10. The positioning system according to claim 9, wherein the first reference time is the same as the second reference time.

11. The positioning system according to claim 8, wherein the calculation device and the device to be positioned are separately configured, and communicate in a wired or wireless manner.

12. The positioning system according to claim 9, wherein the second reference time is time of emitting the distance measuring signal obtained based on the transmission time of the synchronization signal and a set time difference.

13. A positioning method, comprising:
receiving, a synchronization signal transmitted from a synchronization device in a positioning base station, two laser plane signals having a preset angle therebetween emitted from the positioning base station and a distance measuring signal emitted from a distance measuring device, and recording a first reference time at which the synchronization signal is received, a first time and a second time at which the two laser plane signals are respectively received, and a third time at which the distance measuring signal is received, respectively;

determining, according to the first reference time, the first time, the second time and a rotation speed of a rotating laser plane emitting unit in the positioning base station, a first rotation angle of a target laser plane rotating based on the first reference time to the first time, and a second rotation angle of the target laser plane rotating based on the first reference time to the second time; wherein the target laser plane is a plane formed by a laser plane signal that firstly scans the device to be positioned in the two laser plane signals;

determining, according to a second reference time at which a distance measuring signal is emitted, the third time at which the device to be positioned receives the distance measuring signal, a distance between the device to be positioned and the positioning base station; and determining, according to the first rotation angle, the second rotation angle and the distance between the device to be positioned and the positioning base station, a position of the device to be positioned.

14. The method according to claim 13, wherein the two laser plane signals having a preset angle therebetween emitted from the positioning base station is emitted by the rotating laser plane emitting unit, wherein the rotating laser plane emitting unit comprises a laser source, an emission grating and a driving device;

wherein the laser source is configured to emit a line laser signal;

wherein the emission grating is configured to convert the line laser signal emitted from the laser source to the two laser plane signals having the preset angle therebetween; and the driving device is configured to drive the two laser plane signals emitted from the emission grating to rotate around a rotation axle so that the two laser plane signals scan the space separately.

15. The method according to claim 14, wherein the emission grating is an optical structure, comprising a first portion and a second portion;

the first portion is configured to convert the line laser signal emitted from the laser source to a first laser plane signal;

the second portion is configured to convert the line laser signal emitted from the laser source to a second laser plane signal;

wherein the first laser plane signal and the second laser plane signal have the preset angle therebetween.

16. The method according to claim 13, wherein the two laser plane signals comprises a first laser plane signal and a second laser plane signal, a plane formed by the first laser plane signal parallels a rotation axle, a plane formed by the second laser plane signal is disposed at 45° with respect to the rotation axle;

wherein the determining, according to the first rotation angle, the second rotation angle and the distance between the device to be positioned and the positioning base station, the position of the device to be positioned comprises:

determining the position of the device to be positioned based on the following formula:

$$x = \frac{l\cos\theta_1}{\sqrt{1+\sin^2(\theta)}}$$

$$y = \frac{l\sin(\theta)}{\sqrt{1+\sin^2(\theta)}}$$

$$z = \frac{l\sin\theta_1}{\sqrt{1+\sin^2(\theta)}};$$

wherein x denotes a coordinate of the device to be positioned in a direction of X-axis, y denotes a coordinate of the device to be positioned in a direction of Y-axis, z denotes a coordinate of the device to be positioned in a direction of Z-axis; l denotes the distance between the device to be positioned and the positioning base station; wherein $\theta=\theta_2-\theta_1$, $\theta_1$ denotes the first rotation angle, and $\theta_2$ denotes the second rotation angle.

17. The method according to claim 13, wherein the two laser plane signals comprises a first laser plane signal and a second laser plane signal, wherein a plane formed by the first laser plane signal is disposed at 90° with respect to a plane formed by the second laser plane signal, and the plane formed by the first laser plane signal and the plane formed by the second laser plane signal are all disposed at 45° with respect to the rotation axle;

wherein the determining, according to the first rotation angle, the second rotation angle and the distance between the device to be positioned and the positioning base station, the position of the device to be positioned comprises:

determining the position of the device to be positioned based on the following formula:

$$x = \frac{l\cos\theta_1}{\sqrt{1+\sin^2\left(\frac{\theta}{2}\right)}}$$

$$y = \frac{l\sin\left(\frac{\theta}{2}\right)}{\sqrt{1+\sin^2\left(\frac{\theta}{2}\right)}}$$

$$z = \frac{l\sin\theta_1}{\sqrt{1+\sin^2\left(\frac{\theta}{2}\right)}};$$

wherein x denotes a coordinate of the device to be positioned in a direction of X-axis, y denotes a coordinate of the device to be positioned in a direction of Y-axis, z denotes a coordinate of the device to be positioned in a direction of Z-axis; l denotes the distance between the device to be positioned and the positioning base station; wherein $\theta=\theta_2-\theta_1$, $\theta_1$ denotes the first rotation angle, and $\theta_2$ denotes the second rotation angle.

18. The method according to claim 13, wherein the two laser plane signals comprises a first laser plane signal and a second laser plane signal, a plane formed by the first laser plane signal is disposed at a third preset angle with respect to the rotation axle, the plane formed by the second laser plane signal is disposed at a fourth preset angle with respect to the rotation axle;

wherein the determining, according to the first rotation angle, the second rotation angle and the distance between the device to be positioned and the positioning base station, the position of the device to be positioned comprises:

determining the position of the device to be positioned based on the following formula:

$$x = r\cos\theta_1$$

$$y = r\sin\beta_1 \cot\alpha_1$$

$$z = r\sin\theta_1;$$

wherein x denotes a coordinate of the device to be positioned in a direction of X-axis, y denotes a coordinate of the device to be positioned in a direction of Y-axis, z denotes a coordinate of the device to be positioned in a direction of Z-axis; l denotes the distance between the device to be positioned and the positioning base station;

$$\beta_1 = \arctan\left(\frac{\sin\theta\cot\alpha_2}{\cot\alpha_1 + \cos\theta\cot\alpha_2}\right), \quad r = \frac{l}{\sqrt{1+\sin^2\beta_1\cot^2\alpha_1}},$$

wherein $\alpha_1$ denotes the fourth preset angle; $\alpha_2$ denotes the third preset angle; wherein $\theta=\theta_2-\theta_1$, $\theta_1$ denotes the first rotation angle, and $\theta_2$ denotes the second rotation angle.

19. A computer-readable storage medium storing computer-executable instructions, wherein the computer-executable instructions are used for executing the method according to claim 13.

* * * * *